US009614768B2

(12) United States Patent
Li (10) Patent No.: US 9,614,768 B2
(45) Date of Patent: Apr. 4, 2017

(54) METHOD FOR TRAFFIC LOAD BALANCING (75) Inventor: Wei Li, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 315 days.

(21) Appl. No.: 13/979,449

(22) PCT Filed: Apr. 6, 2012

(86) PCT No.: PCT/CN2012/000454
§ 371 (c)(1),
(2), (4) Date: Jul. 12, 2013

(87) PCT Pub. No.: WO2012/136078
PCT Pub. Date: Oct. 11, 2012

(65) Prior Publication Data
US 2014/0016470 A1 Jan. 16, 2014

(30) Foreign Application Priority Data
Apr. 6, 2011 (CN) .......................... 2011 1 0086357

(51) Int. Cl.
H04L 12/803 (2013.01)
H04L 12/709 (2013.01)
(Continued)

(52) U.S. Cl.
CPC .......... *H04L 47/125* (2013.01); *H04L 45/245* (2013.01); *H04L 45/586* (2013.01);
(Continued)

(58) Field of Classification Search
None
See application file for complete search history.

(56) References Cited

U.S. PATENT DOCUMENTS 6,307,860 B1 * 10/2001 Joffe .................. H04L 12/5601
370/389
6,532,212 B1 * 3/2003 Soloway .................. H04L 45/00
370/230
(Continued)

FOREIGN PATENT DOCUMENTS

CN 1484413 3/2004
CN 101605104 12/2009
(Continued)

OTHER PUBLICATIONS

CN First Office Action dated Jan. 16, 2013 issued on CN Patent Application No. 201110086357.2 filed on Apr. 6, 2011, The State Intellectual Property Office of China, P.R. China.
(Continued)

*Primary Examiner* — Jeffrey M Rutkowski
*Assistant Examiner* — Jonathan B Wood
(74) *Attorney, Agent, or Firm* — Hewlett Packard Enterprise Patent Department (57) ABSTRACT According to an example, a stacking device in a distribution layer may monitor traffic in an aggregation link between the stacking device and a core layer. When a traffic unbalance is detected in the aggregation link, the stacking device may find a data flow that causes the traffic unbalance from data flows transferred over the aggregation link and an incoming interface through which the found data flow enters the stacking device. The stacking device may also reallocate a new MAC address to the incoming interface and may send the new MAC address allocated to the incoming interface to a terminal server, so as to enable the traffic unbalance to transit to traffic balance by way of the terminal server sending a data flow with the new MAC address as the destination MAC address.

15 Claims, 9 Drawing Sheets (51) Int. Cl.
*H04L 12/713* (2013.01)
*H04L 12/801* (2013.01)
*H04L 12/891* (2013.01)

(52) U.S. Cl.
CPC .............. *H04L 47/29* (2013.01); *H04L 47/41* (2013.01); *Y02B 60/33* (2013.01)

(56) References Cited

U.S. PATENT DOCUMENTS

| | | | |
|---|---|---|---|
| 6,628,613 B1* | 9/2003 | Joung | H04L 47/10 370/230 |
| 6,640,238 B1* | 10/2003 | Bowman-Amuah | G06F 9/541 709/201 |
| 6,657,952 B1* | 12/2003 | Shiragaki | H04J 14/0212 370/223 |
| 6,865,160 B1* | 3/2005 | Bare | 370/256 |
| 7,602,705 B1* | 10/2009 | Sivasankaran | H04L 49/351 370/218 |
| 7,643,468 B1* | 1/2010 | Arregoces et al. | 370/351 |
| 7,706,255 B1* | 4/2010 | Kondrat | H04L 47/10 370/219 |
| RE41,397 E * | 6/2010 | Latif et al. | 709/226 |
| 7,940,661 B2* | 5/2011 | Ervin et al. | 370/232 |
| 8,194,680 B1* | 6/2012 | Brandwine | H04L 61/103 370/398 |
| 8,204,061 B1* | 6/2012 | Sane et al. | 370/397 |
| 8,218,561 B2* | 7/2012 | Akhter | H04L 43/0817 370/419 |
| 8,259,585 B1* | 9/2012 | S P | H04L 45/125 370/237 |
| 8,539,094 B1* | 9/2013 | Marr | H04L 47/125 709/201 |
| 8,570,859 B1* | 10/2013 | Satapathy | H04L 1/22 370/225 |
| 8,817,643 B1* | 8/2014 | Sun | H04W 24/04 370/252 |
| 2001/0034792 A1* | 10/2001 | Swildens | H04L 29/06 709/238 |
| 2002/0136163 A1* | 9/2002 | Kawakami | H04L 47/26 370/229 |
| 2003/0147385 A1* | 8/2003 | Montalvo et al. | 370/389 |
| 2003/0218977 A1* | 11/2003 | Pan | H04L 12/2602 370/230 |
| 2004/0085904 A1* | 5/2004 | Bordogna | H04L 47/10 370/236 |
| 2004/0223452 A1* | 11/2004 | Santos | H04L 47/10 370/229 |
| 2005/0025179 A1 | 2/2005 | McLaggan et al. | |
| 2005/0066216 A1* | 3/2005 | Hebbar et al. | 714/1 |
| 2005/0100031 A1* | 5/2005 | Choe | H04L 12/42 370/404 |
| 2005/0195834 A1* | 9/2005 | Kikuchi | 370/396 |
| 2006/0106923 A1* | 5/2006 | Arregoces et al. | 709/223 |
| 2006/0171303 A1* | 8/2006 | Kashyap | 370/228 |
| 2006/0206706 A1* | 9/2006 | Dietz | 713/154 |
| 2006/0215550 A1* | 9/2006 | Malhotra | H04L 47/10 370/229 |
| 2007/0086442 A1* | 4/2007 | Waitzmann | H04L 29/06027 370/352 |
| 2007/0091811 A1* | 4/2007 | Thubert | H04L 43/022 370/238 |
| 2008/0025234 A1* | 1/2008 | Zhu et al. | 370/256 |
| 2008/0181243 A1* | 7/2008 | Vobbilisetty | H04L 45/00 370/406 |
| 2009/0034460 A1* | 2/2009 | Moratt | H04W 72/04 370/329 |
| 2009/0063706 A1* | 3/2009 | Goldman | H04L 45/66 709/250 |
| 2009/0135722 A1* | 5/2009 | Boers | H04L 45/00 370/236 |
| 2009/0175163 A1* | 7/2009 | Sammour | H04L 1/1685 370/216 |
| 2009/0290537 A1* | 11/2009 | Berglund | H04L 12/4633 370/328 |
| 2010/0046537 A1* | 2/2010 | Perlmutter | H04L 47/125 370/419 |
| 2010/0067374 A1* | 3/2010 | Elangovan | H04L 12/1886 370/230 |
| 2010/0080144 A1* | 4/2010 | Greenberg et al. | 370/253 |
| 2010/0118830 A1* | 5/2010 | Stephenson | H04L 63/10 370/331 |
| 2010/0182920 A1* | 7/2010 | Matsuoka | H04L 12/2602 370/252 |
| 2010/0195489 A1* | 8/2010 | Zhou et al. | 370/216 |
| 2010/0215042 A1* | 8/2010 | Sato et al. | 370/392 |
| 2010/0246396 A1 | 9/2010 | Licardie et al. | |
| 2010/0325257 A1* | 12/2010 | Goel | H04L 29/12028 709/223 |
| 2011/0051602 A1* | 3/2011 | Matthews et al. | 370/235 |
| 2011/0116443 A1* | 5/2011 | Yu et al. | 370/328 |
| 2011/0142053 A1* | 6/2011 | Van Der Merwe | H04L 47/72 370/395.1 |
| 2011/0158240 A1* | 6/2011 | Sun et al. | 370/392 |
| 2011/0176412 A1* | 7/2011 | Stine et al. | 370/221 |
| 2011/0267947 A1* | 11/2011 | Dhar | H04L 47/125 370/235 |
| 2011/0271009 A1* | 11/2011 | Doshi | H04L 45/00 709/242 |
| 2011/0282998 A1* | 11/2011 | Johnsson | H04L 29/12283 709/226 |
| 2011/0283278 A1* | 11/2011 | Murrell | G06F 9/5077 718/1 |
| 2011/0320577 A1* | 12/2011 | Bhat | H04L 45/586 709/222 |
| 2012/0033665 A1* | 2/2012 | Jacob Da Silva et al. | 370/389 |
| 2012/0033672 A1* | 2/2012 | Page | H04L 45/245 370/395.53 |
| 2012/0033678 A1* | 2/2012 | Page et al. | 370/401 |
| 2012/0089714 A1* | 4/2012 | Carley | 709/223 |
| 2012/0113835 A1* | 5/2012 | Alon et al. | 370/252 |
| 2012/0117228 A1* | 5/2012 | Gabriel et al. | 709/224 |
| 2012/0134266 A1* | 5/2012 | Roitshtein et al. | 370/230 |
| 2012/0182866 A1* | 7/2012 | Vinayagam et al. | 370/228 |
| 2012/0195589 A1* | 8/2012 | Nors | H04L 45/22 398/5 |
| 2012/0198054 A1* | 8/2012 | Huang | 709/224 |
| 2012/0207175 A1* | 8/2012 | Raman et al. | 370/412 |
| 2012/0234042 A1 | 9/2012 | Perrault et al. | |
| 2013/0064102 A1* | 3/2013 | Chang et al. | 370/244 |
| 2014/0359089 A1* | 12/2014 | Davis et al. | 709/221 |
| 2015/0103840 A1* | 4/2015 | Narayanaswamy et al. | 370/401 |

FOREIGN PATENT DOCUMENTS

| | | |
|---|---|---|
| CN | 101610283 | 12/2009 |
| CN | 101815007 | 8/2010 |
| CN | 101977153 | 2/2011 |
| CN | 102118319 | 7/2011 |
| KR | 20040074680 | 8/2004 |
| WO | 2009/045130 A1 | 4/2009 |

OTHER PUBLICATIONS

International Search Report and Written Opinion dated Jul. 5, 2012 issued on PCT Patent Application No. PCT/CN2012/000454 filed on Apr. 6, 2012, The State Intellectual Property Office, the P.R. China.

Extended European Search Report dated Feb. 5, 2015, EP Patent Application No. 12768617.8 dated Apr. 6, 2012, European Patent Office.

Roger Lapuh, et al., "Split Multi-link Trunking (SMLT); draft-lapuh-network-smlt-88.txt", Network Working Group, dated Jul. 7, 2008, The IETF Trust.

* cited by examiner

METHOD FOR TRAFFIC LOAD BALANCING

CLAIM FOR PRIORITY

The present application is a national stage filing under 35 U.S.C 371 of PCT application number PCT/CN2012/000454, having an international filing date of Apr. 6, 2012, which claims priority to Chinese Patent Application No. 201110086357.2, filed Apr. 6, 2011, the disclosures of which are hereby incorporated by reference in their entireties.

BACKGROUND

With the increasing dependence of an enterprise on information access, the influences of a data center on the daily business of the enterprise are also increasing. Once a fault occurs to the data center in the enterprise, the normal operation of the enterprise's daily business will be greatly impacted, causing significant losses to the enterprise. Generally speaking, when a fault occurs to the data center, the losses suffered by the enterprise fall into the following categories: impact on the daily enterprise work (e.g. employees cannot work as normal), direct property loss (e.g. loss of orders, compensation to the loss of the enterprise's partners, etc.), damages to the enterprise's reputation (e.g. loss of some clients). Therefore, the reliability has become an important aspect in evaluating the quality of a data center.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

In order to improve reliability of a data center, a network in a data center usually employs a redundant networking solution with dual nodes and dual links. Additionally, the link aggregation technology and stacking technology can be employed to improve utilization of network devices and links. The link aggregation technology and the stacking technology are described below.

Link Aggregation Technology

Link aggregation, also referred to as Ethernet link aggregation, is to form a logical aggregation link by aggregating a plurality of physical Ethernet ports together. That is to say, a plurality of physical links in the same aggregation link are considered as one logical link. Wherein, the plurality of physical links that constitute the aggregation link are referred to as member links. Through link aggregation, data traffic can be shared among the member links within the aggregation link so that the bandwidth is increased and each member link within the same aggregation link provides dynamic backup to each other, which improves connection reliability.

The aggregation link can be divided into two types: a load-sharing aggregation link and a non-load-sharing aggregation link. The load-sharing aggregation link is currently the dominant application mode. Wherein, the aggregation load-sharing mode of the load-sharing aggregation link can be selectively configured. The load sharing for traffic within an aggregation group can be flexibly achieved by changing the aggregation load-sharing mode.

Stacking Technology

The so-called stacking technology is to cascade a plurality of devices together via stacking ports, and to virtualize them into a "distributed device" after configuration. For ease of description, this "virtual device" is also referred to as a stacking device and each device that constitutes the stacking device is referred to as a member device, with the connection between each member device being referred to as a stacking link. Through the stacking technology, cooperation, centralized management and uninterrupted maintenance of a plurality of member devices can be achieved.

In the stacking technology there exists a concept of local forwarding first. This concept of local forwarding first specifically refers to the following: a data stream received by a member device in the stacking device will be forwarded preferentially through an outgoing interface of the present member device, and only when the present member device does not have an outgoing interface, the received data stream will be sent to another member device through a stacking link to be forwarded over the outgoing interface of this another member device. For example, two switches (e.g. switch 1 and switch 2) cascade to form a stacking device, wherein both the downlink and the uplink of the stacking device support link aggregation. A data stream received by a member device in the stacking device such as switch 1 will be forwarded preferentially through its outgoing interface (i.e. the outgoing interface of switch 1). Only when switch 1 does not have an outgoing interface, the received data stream will be forwarded to another member device such as switch 2 through a stacking link between switch 1 and switch 2, and the data stream will be forwarded over the outgoing interface of switch 2. By way of local forwarding first, a data stream normally does not pass the stacking link. As such, member devices in a stacking device may not need to set many stacking ports, which lowers the cost for the device, and because a data stream is forwarded through a minimum number of devices, the forwarding delay can be reduced.

The above has described the link aggregation technology and the stacking technology. Networking of a data center that employs the link aggregation technology and the stacking technology will be described below.

The networking of a data center is typically divided into three layers: a core layer, an access layer and a distribution layer between them, wherein devices in the distribution layer cascade to form a stacking device, devices in the core layer cascade to form a stacking device and the access layer does not employ the stacking technology. Devices in each layer (i.e. access devices in the access layer, the stacking device in the distribution layer and the stacking device in the core layer) are connected through aggregation links. There is at least one aggregation link between the stacking device in the distribution layer and the stacking device in the core layer.

In a typical networking mode, the access devices in the access layer respectively connect to more than one terminal servers and the devices in the distribution layer act as gateways and routes run between the distribution layer and the core layer.

In this kind of networking, a data stream sent by a terminal server first arrives at the access layer. When an access device in the access layer receives the data stream, it performs a Hash operation on the configured load balancing algorithm and the destination MAC address of this data stream, selects a member link from the aggregation link used for forwarding this data stream according to the result of the Hash operation (i.e. to select an aggregation outgoing port for forwarding this data stream), and then forwards this data stream to the distribution layer through this member link.

In the following, certain examples are described in detail with reference to the drawings.

Figure 1:
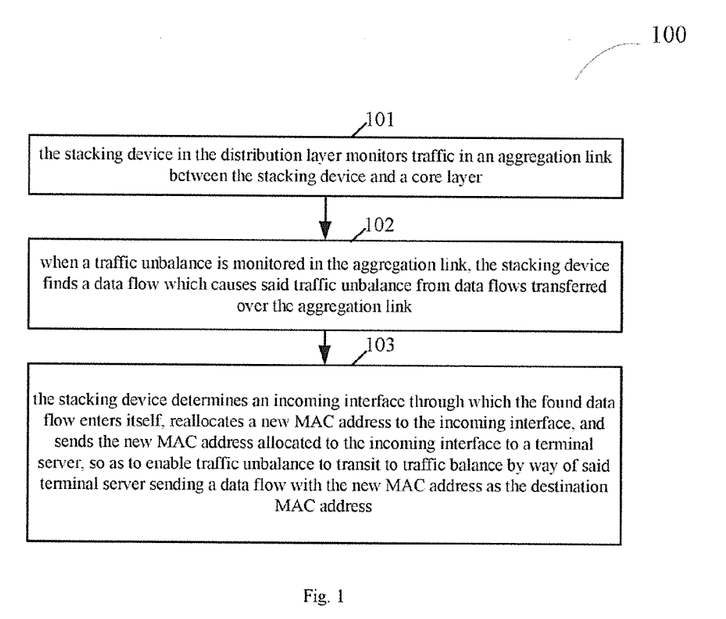
FIG. 1 illustrates a method for balancing traffic load according to an example.

With reference to FIG. 1, FIG. 1 illustrates a method 100 for balancing traffic load according to an example. The process shown in FIG. 1 can be applied in a networking mode where an access layer is used to access, devices in a distribution layer serve as gateways and the routes run between the distribution layer and a core layer. Wherein, an access device in the access layer forwards a data stream from a terminal server to the distribution layer based on the destination MAC address of the data stream and the stacking device in the distribution layer forwards the received data stream to the core layer through an aggregation link.

As shown in FIG. 1, the method 100 comprises:

block 101, the stacking device in the distribution layer monitors traffic in an aggregation link between the stacking device and a core layer;

block 102, when a traffic unbalance is monitored in the aggregation link, the stacking device finds a data flow which causes said traffic unbalance from data flows transferred over the aggregation link; and block 103, the stacking device determines an incoming interface through which the found data flow enters itself, reallocates a new MAC address to the incoming interface, and sends the new MAC address allocated to the incoming interface to a terminal server, so as to enable traffic unbalance to transit to traffic balance by way of said terminal server sending a data flow with the new MAC address as the destination MAC address.

In this example, with regard to block 101, the monitored aggregation link is at least one aggregation link designated from the aggregation links between the stacking device and the core layer, and the operation of designation can be performed by a user according to experiences or actual situations.

Figure 2:
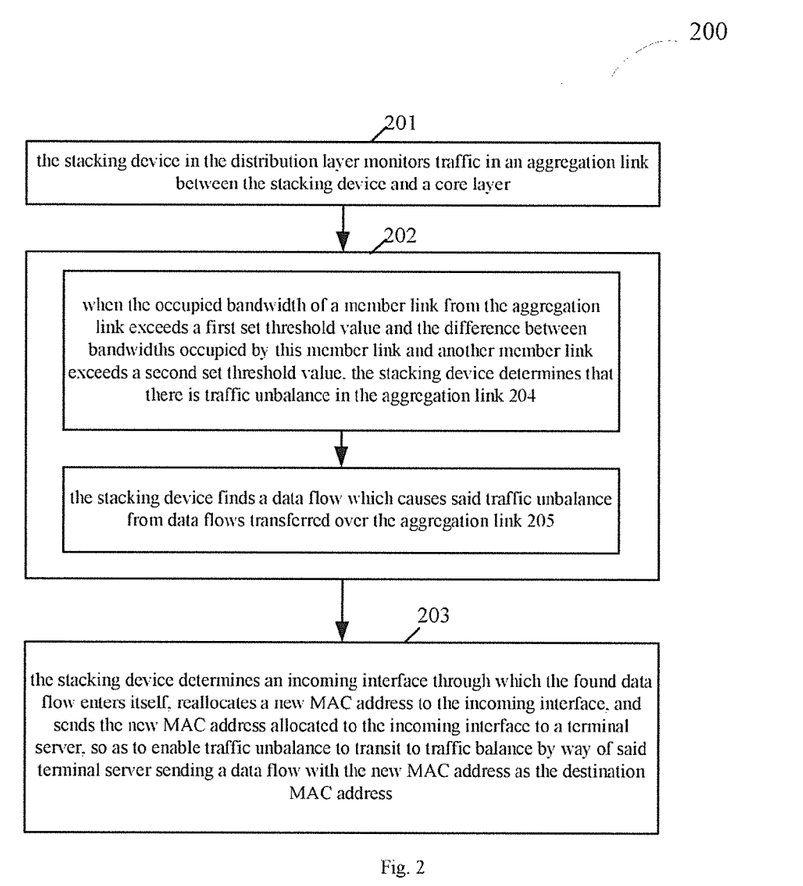
FIG. 2 illustrates another method for balancing traffic load according to another example.

With reference to FIG. 2 now, FIG. 2 illustrates another method 200 for balancing traffic load according to another example, wherein block 201 and block 203 are the same as block 101 and block 103 respectively. In this example, as shown in block 204, the operation of monitoring a traffic unbalance in the aggregation link described in block 102 of FIG. 1 comprises: when the occupied bandwidth of a member link from the aggregation link exceeds a first set threshold value and the difference between bandwidths occupied by this member link and another member link exceeds a second set threshold value, determining by the stacking device that there is traffic unbalance in the aggregation link. Then the method 200 proceeds to block 205, where the stacking device finds a data flow which causes traffic unbalance from data flows transferred over the aggregation link.

Figure 3:
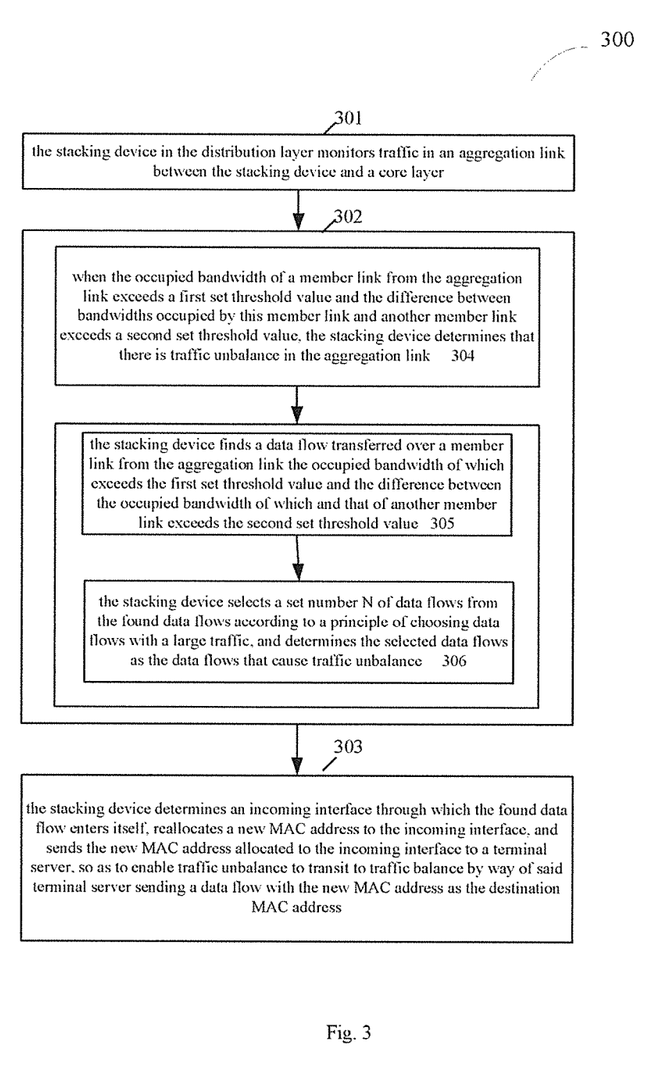
FIG. 3 illustrates yet another method for balancing traffic load according to yet another example.

With reference to FIG. 3, FIG. 3 illustrates yet another method for balancing traffic load according to yet another example, wherein block 301 and block 303 are the same as block 101 and block 103 respectively and block 304 is the same as block 204 as described above. And blocks 305 and 306 represent an example way of finding a data flow which causes the traffic unbalance from data flows transferred over the aggregation link as described in block 102. More specifically, in this example, after the stacking device monitors that there is traffic unbalance in the aggregation link, the method 300 proceeds to block 305, where the stacking device finds a data flow transferred over a member link from the aggregation link, the occupied bandwidth of which exceeds the first set threshold value and the difference between the occupied bandwidth of which and that of another member link exceeds the second set threshold value. Then the method 300 proceeds to block 306, where the stacking device selects a set number N of data flows from the data flows found in block 305 according to a principle of choosing data flows with a large traffic, and determines the selected data flows as the data flows that cause traffic unbalance. For instance, assuming that an aggregation link L1 exists between the stacking device in the distribution layer and the core layer and the aggregation link L1 has at least two member links L1$a$ and L1$b$, when the stacking device monitors that the occupied bandwidth of a member link L1$a$ from the aggregation link L1 exceeds the first set threshold value and the difference between bandwidths occupied by this member link and another member link such as L1$b$ exceeds the second set threshold value, the stacking device determines that there is traffic unbalance in the aggregation link L1. The stacking device then finds data flows transferred over the member link L1$a$ from the aggregation link L1, selects N data flows from the found data flows that have a relatively large traffic, and determines the selected N data flows as the data flows that cause traffic unbalance in the aggregation link L1.

In this example, the first set threshold value is independent from the second set threshold value. Both threshold values can be set according to experiences or actual situations and the present disclosure is not limited in this regard.

Additionally, in the above example, the number N can also be set according to experiences or actual situations. For instance, N can take the value of 10.

Figure 4:
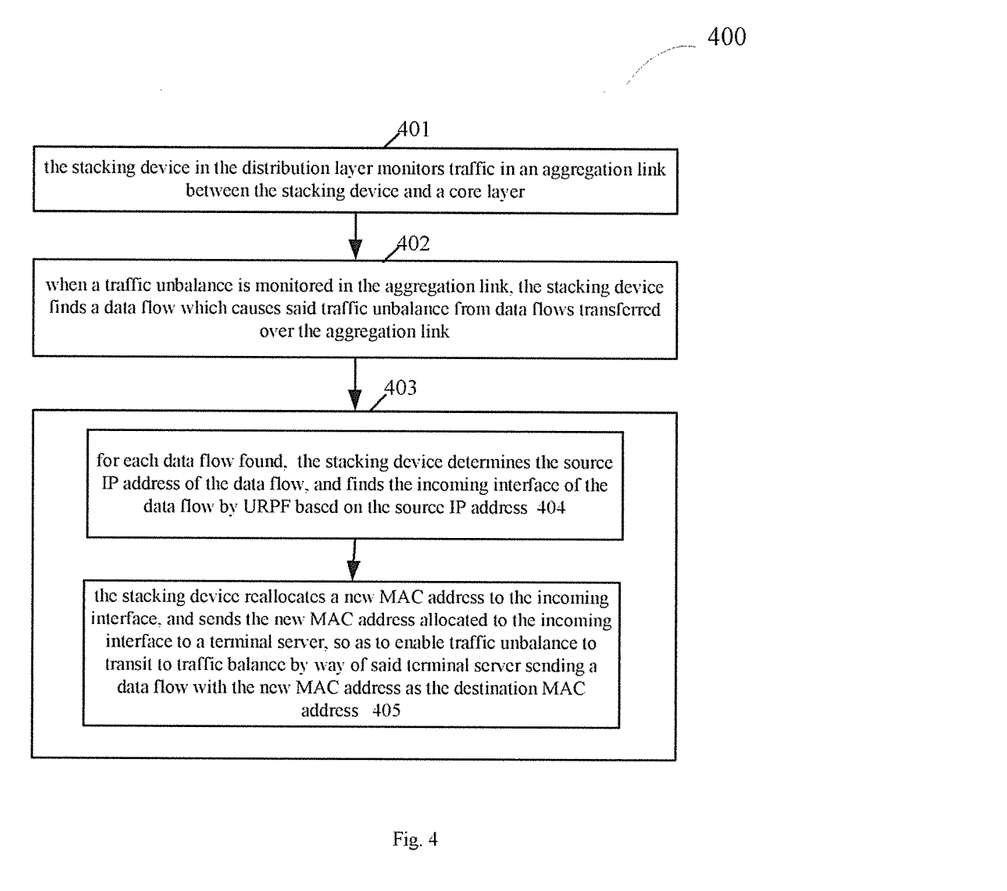
FIG. 4 illustrates still another method for balancing traffic load according to an example.

With reference to FIG. 4, FIG. 4 illustrates still another method 400 for balancing traffic load according to another example, wherein block 401 and block 402 are the same as block 101 and block 102 respectively and block 403 represents an example way of determining by the stacking device an incoming interface through which the found data flow enters itself as described in block 103. More specifically, as shown in block 404, the stacking device determines for each found data flow the source IP address of the data flow, and finds the incoming interface of the data flow by unicast reverse path forwarding (URPF) based on the determined source IP address. Then the method 400 proceeds to block 405, where the stacking device reallocates a new MAC address to the incoming interface, and sends the new MAC address allocated to the incoming interface to a terminal server, so as to enable traffic unbalance to transit to traffic balance by way of said terminal server sending a data flow with the new MAC address as the destination MAC address.

In this example, the above described incoming interface is specifically a VLAN virtual interface. The MAC address of the VLAN virtual interface is the destination MAC address that is used by the terminal server to forward a data stream to the distribution layer through an access device, and this MAC address is allocated to this VLAN virtual interface by a member device of the stacking device in the distribution layer such as a switch in the distribution layer when it creates the VLAN virtual interface. Thus, this MAC address can be modified, that is to say, the MAC address of the VLAN virtual interface can be reallocated.

Figure 5:
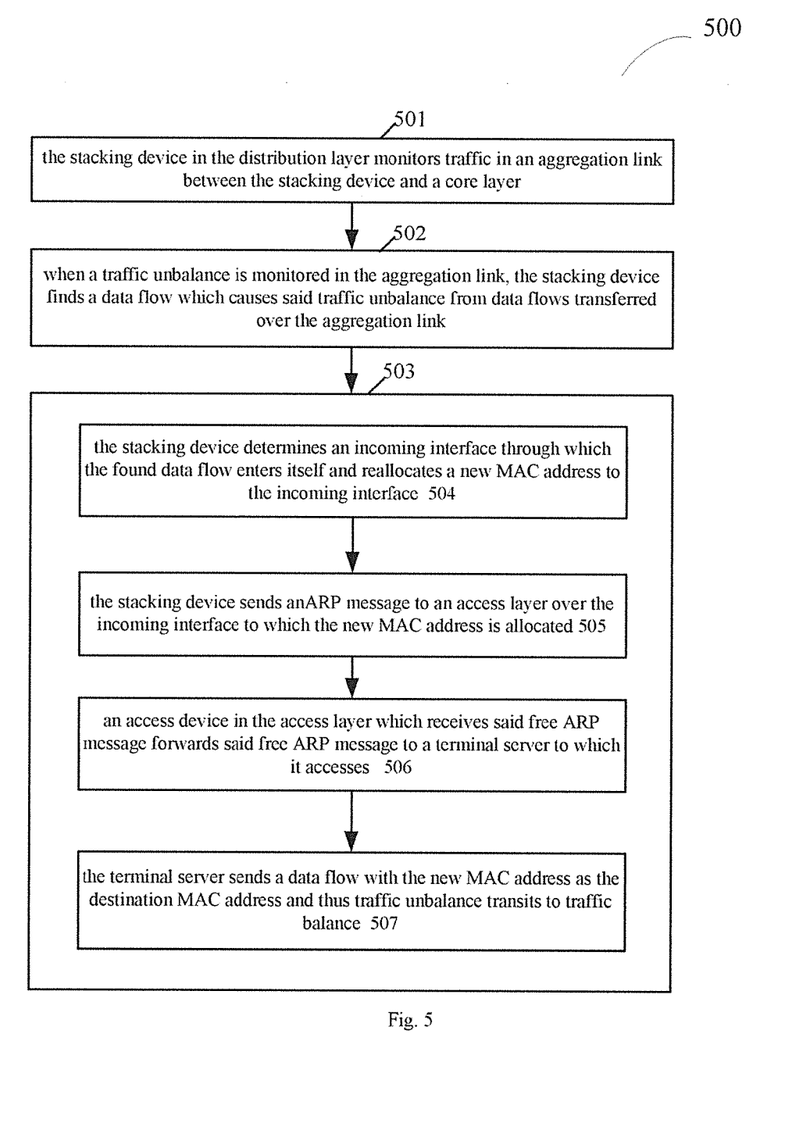
FIG. 5 illustrates a further method for balancing traffic load according to an example.

With reference now to FIG. 5, FIG. 5 illustrates a further method 500 for balancing traffic load according to another example, wherein block 501 and block 502 in method 500 are the same as block 101 and block 102 respectively. In this example, as shown in block 504, the stacking device determines an incoming interface through which the data flow found in block 502 enters itself and reallocates a new MAC address to the incoming interface. Then the method 500 proceeds to block 505, where the stacking device sends a free address resolution protocol (ARP) message over the incoming interface to which the new MAC address is allocated. At block 506, an access device in the access layer which receives said free ARP message forwards the free ARP message to a terminal server to which it connects. At block 507, the terminal server sends a data stream with the new MAC address as the destination MAC address and thus traffic unbalance can transit to traffic balance.

It can be seen from the above description that, the stacking device sending the new MAC address allocated to the incoming interface to the terminal server as described in block 103 of FIG. 1 is achieved through an access device in the access layer, as blocks 505 and 506 indicate.

Figure 6:
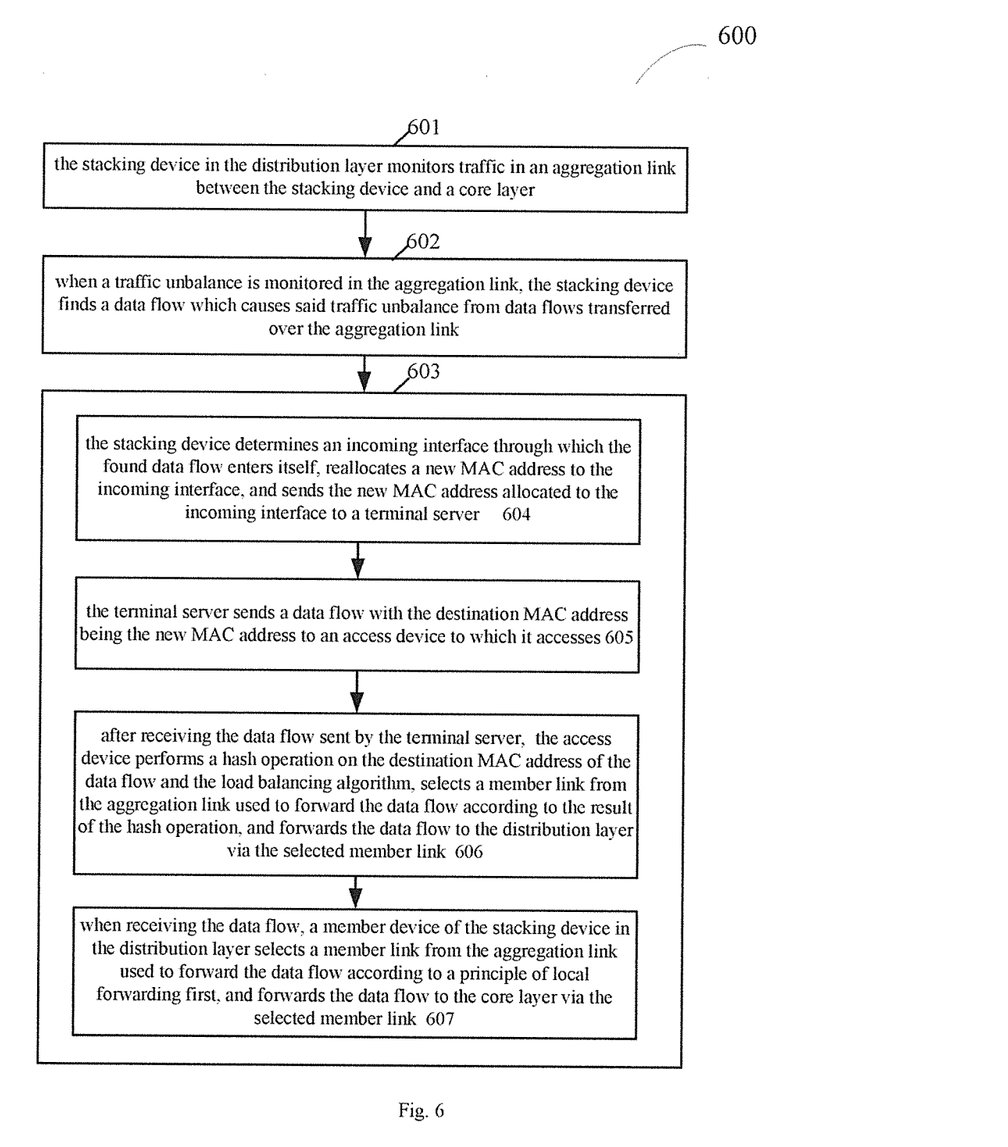
FIG. 6 illustrates another method for balancing traffic load according to another example.

With reference to FIG. 6, FIG. 6 illustrates another method 600 for balancing traffic load according to another example, wherein block 601 and block 602 are the same as block 101 and block 102 respectively and the operation of enabling said traffic unbalance to transit to traffic balance by way of the terminal server sending a data flow with the new MAC address as the destination MAC address as described in block 103 further comprises blocks 605-607. More specifically, in this example, the method 600 proceeds from block 602 to block 603, where the stacking device determines an incoming interface through which the found data flow enters itself, reallocates a new MAC address to the incoming interface, and sends the new MAC address allocated to the incoming interface to a terminal server. Then the method 600 proceeds to block 605, where the terminal server sends a data flow with the destination MAC address being the new MAC address to an access device to which it accesses. At block 606, after receiving the data flow sent by the terminal server, said access device performs a hash operation on the destination MAC address of the data flow and the load balancing algorithm, selects a member link from the aggregation link used to forward the data flow according to the result of the hash operation, and forwards the data flow to the distribution layer via the selected member link. In an example, each member link in the aggregation link used for forwarding the data stream can be numbered and a member link whose number is the result of the hash operation is selected from the aggregation link. Then at block 607, when receiving the data flow, a member device of the stacking device in the distribution layer selects a member link from the aggregation link used to forward the data flow according to the principle of local forwarding first, and forwards the data flow to the core layer via the selected member link.

In terms of probability, when an access device determines a member link based on the new MAC address, the determined member link will be different from the previously determined member link due to the difference between the new MAC address and the old MAC address that was based on (i.e. the MAC address used before the new MAC address is allocated), thus ensuring that the data stream forwarded this time and the previous data streams arrive at different member devices of the stacking device in the distribution layer. In this way, because the member devices of the stacking device in the distribution layer have the characteristic of local forwarding first, when a member device different from the previous ones receives the data stream, it will preferentially forward the received data stream to the core layer via its own outgoing port.

This may help to avoid the situation where traffic in the member links of the aggregation link between the stacking device in the distribution layer and the core layer is unbalanced (for instance, in the aggregation link, a member link can be overloaded and starts to lose packets, while the other member links can be under loaded) due to data streams with different traffic being transmitted from different terminal servers or different business applications to the stacking device in the distribution layer, and thus help improve the quality of user service and forwarding performance of the whole system.

Figure 7:
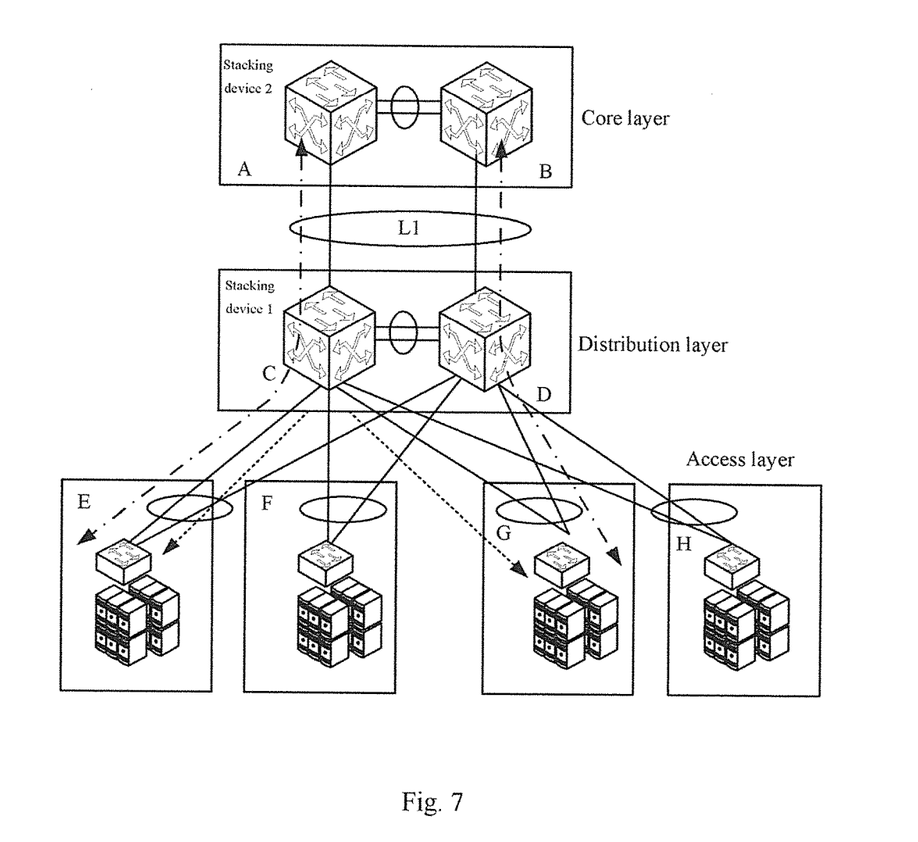
FIG. 7 illustrates a schematic diagram of an application where an example of the present disclosure can be used.

With reference to FIG. 7 now, FIG. 7 illustrates a schematic diagram of networking where an example of the present disclosure can be used. For sake of simplicity, FIG. 7 only shows that there is one stacking device in the distribution layer (i.e. stacking device 1 formed by two cascaded devices C and D), there is one stacking device in the core layer (i.e. stacking device 2 formed by two cascaded devices A and B) and there are four access devices in the access layer (i.e. device E to device H). FIG. 7 assumes that the access devices in the access layer are not designed according to IRF.

In addition, devices between those layers in FIG. 7 are connected by aggregation links, as shown by the circles in FIG. 7. And for ease of description, FIG. 7 only shows that there is one aggregation link L between the stacking device 1 and the stacking device 2. This aggregation link L includes two member links, namely the link $L_{CA}$ between device C and device A and the link $L_{DB}$ between device D and device B. The principle of this one aggregation link can also apply to a plurality of aggregation links.

Following the process of FIG. 1, first the stacking device 1 monitors the traffic in the aggregation link L. If there are multiple aggregation links between the stacking device 1 and the stacking device 2, then one or more aggregation links can be designated from the multiple aggregation links according to experiences or actual situations.

When the stacking device 1 monitors that the occupied bandwidth of a member link (hereinafter, taking $L_{CA}$ for example) from the aggregation link L (here, the percentage of the occupied bandwidth can be used) exceeds a first set threshold value and the difference between this occupied bandwidth and the occupied bandwidth of another member link $L_{DB}$ (here, the percentage of the occupied bandwidth can be used) exceeds a second set threshold value, the stacking device determines that there is serious traffic unbalance in the aggregation link L and it needs to be adjusted.

Based on this, the stacking device 1 finds N data flows with a relatively large traffic from $L_{CA}$. Then, for each data flow, the stacking device 1 finds an incoming interface (i.e. VLAN virtual interface) through which the data flow enters said stacking device by unicast reverse path forwarding (URPF) based on the source IP address of the data flow and reallocates a new MAC address to the VLAN virtual interface corresponding to the data stream, wherein the allocation can be implemented in particular by: randomly allocating an MAC address from the MAC address pool corresponding to the distribution layer, as long as it is different from the previous MAC address of this VLAN virtual interface. In this way, VLAN virtual interfaces corresponding to the N data streams can be reallocated an MAC address.

Next, the stacking device 1 sends a free ARP message over the VLAN virtual interface to which a new MAC address is allocated. The access device which receives said free ARP message learns the new MAC address from the free APR message and forwards said free ARP message to a terminal server to which it accesses. And the terminal server obtains the new MAC address from the free ARP message and uses the obtained new MAC address to update an APR entry. When the terminal server sends again a data stream to the VLAN virtual interface to which a new MAC address has been allocated, it uses the new MAC address as the destination address of this data stream. When an access device in the access layer receives the data stream sent again by the terminal server, it will perform Hash operation once again on the new destination MAC address and the load balancing algorithm and selects a member link from the aggregation link used for forwarding this data stream according to the result of this Hash operation. In terms of probability, the member link selected by the access device will be different from the previously determined member link due to the difference between destination MAC addresses. Then the access device sends this data stream to the distribution layer through this selected member link.

When a member device in the stacking device 1 in the distribution layer receives this data stream, it preferentially sends it through its local outgoing port. Based on the above described fact that the member link selected by the access device will be different from the previously determined member link due to the difference between destination MAC addresses, it follows that compared with previously sent data streams, this data stream arrives at a different member device in the stacking device 1 in the distribution layer. For instance, device C in the stacking device 1 is previously reached and device D is reached this time. As such, device D sends the received data stream out over the member link $L_{DB}$ in the aggregation link L, which on one hand reduces loads on $L_{CA}$ and on the other hand tends to balance loads between $L_{DB}$ and $L_{CA}$.

It can be seen that, in terms of probability, the terminal server using the new MAC address as the destination MAC address to send data streams can break the phenomenon that abnormal traffic unbalance exists between member links in the aggregation link, and make this phenomenon transit to a better aspect (i.e. the traffic load between member links of the aggregation link is balanced).

Of course, if the stacking device 1 once again monitors that traffic unbalance occurs in the aggregation link between itself and the core layer at a later time, the above method can be repeated. That is to say, the method according to the above examples is a cyclic, continuously optimizing, and automatic procedure.

In the following an apparatus according to an example of the present disclosure will be described.

Figure 8:
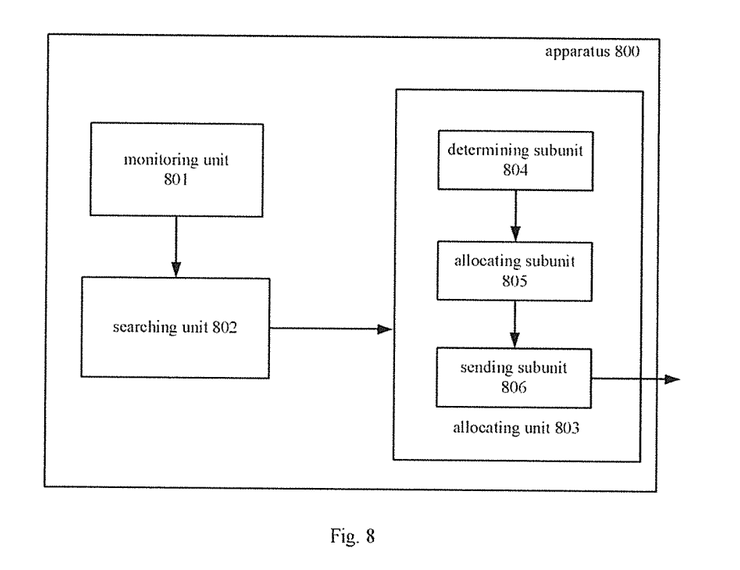
FIG. 8 illustrates a schematic diagram of an apparatus for balancing traffic load according to an example.

With reference to FIG. 8, FIG. 8 illustrates a schematic diagram of an apparatus 800 for balancing traffic load according to an example.

The apparatus 800 is a stacking device in a distribution layer. As shown in FIG. 8, the apparatus 800 comprises a monitoring unit 801, a searching unit 802 and an allocating unit 803.

The monitoring unit 801 is used to monitor traffic in an aggregation link between the apparatus 800 and a core layer.

The searching unit 802 is used, when said monitoring unit 801 monitors traffic unbalance in the aggregation link, to find a data flow which causes the traffic unbalance from data flows transferred over the aggregation link.

The allocating unit 803 further comprises a determining subunit 804, an allocating subunit 805 and a sending subunit 806, wherein, said determining subunit 804 is used to determine an incoming interface through which the data flow found by said searching unit 802 enters said apparatus 800; said allocating subunit 805 is used to reallocate a new MAC address to the incoming interface determined by said determining subunit 804; and said sending subunit 806 is used to send the new MAC address allocated to the incoming interface determined by said determining subunit 804 to a terminal server, so as to enable traffic unbalance to transit to traffic balance by way of said terminal server sending a data flow with the new MAC address as the destination MAC address.

Figure 9:
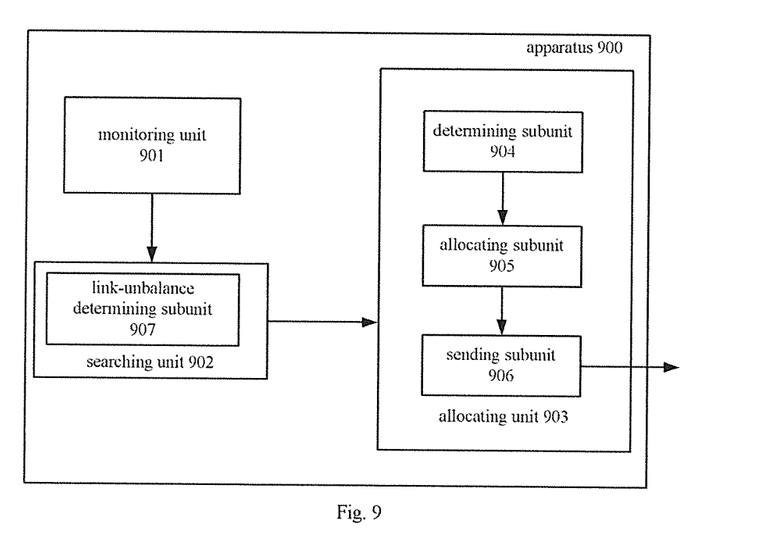
FIG. 9 illustrates a schematic diagram of another apparatus for balancing traffic load according to another example.

With reference to FIG. 9, FIG. 9 illustrates a schematic diagram of another apparatus 900 for balancing traffic load according to another example. FIG. 9 is identical with FIG. 8, except that the searching unit 902 further comprises a link-unbalance determining subunit 907.

According to an example, the link-unbalance determining subunit 907 is used to determine that there is traffic unbalance in the aggregation link when the bandwidth occupied by a member link from the aggregation link exceeds a first set threshold value and the difference between bandwidths occupied by this member link and another member link exceeds a second set threshold value. Other components in FIG. 9 are the same as FIG. 8 and will not be described in detail herein.

Figure 10:
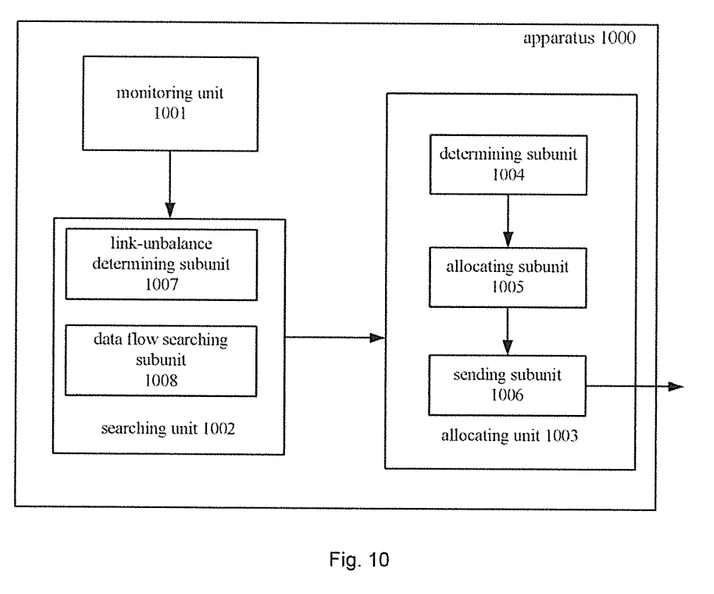
FIG. 10 illustrates a schematic diagram of yet another apparatus for balancing traffic load according to yet another example.

With reference to FIG. 10, FIG. 10 illustrates a schematic diagram of yet another apparatus 1000 for balancing traffic load according to yet another example. FIG. 10 is identical with FIG. 9, except that the searching unit 1002 further comprises a data flow searching subunit 1008.

According to an example, the data flow searching subunit 1008 is used to find a data flow transferred over a member link from the aggregation link the occupied bandwidth of which exceeds the first set threshold value and the difference between the occupied bandwidth of which and that of another member link exceeds the second set threshold value, select a set number N of data flows from the found data flows according to a principle of choosing data flows with a large traffic, and determine the selected data flows as the data flows that cause traffic unbalance. Other components in FIG. 10 are the same as FIG. 8 and will not be described in detail herein.

In an example, said determining subunit 804, 904 or 1004 is used to, determine for each found data flow the source IP address of the data flow, and find an incoming interface of the data flow by unicast reverse path forwarding (URPF) based on the determined source IP address; and said incoming interface is a virtual local area network (VLAN) virtual interface.

According to an example, said sending subunit 806, 906 or 1006 sends a free address resolution protocol (ARP) message to an access layer over the incoming interface to which the new MAC address is allocated, so that an access device in the access layer which receives said free ARP message forwards said free ARP message to a terminal server to which it accesses.

According to an example said apparatus 800, 900 or 1000 further comprises a plurality of member devices which are cascaded to form said apparatus (not shown in FIGS. 8-10).

In this example, when receiving a data flow forwarded by an access device in the access layer, each member device selects a member link from the aggregation link used to forward the data flow according to a principle of local forwarding first, and forwards the data flow to the core layer via the selected member link. Here, the destination MAC address of the data flow is the new MAC address, and the access device forwards the data flow to said member device through the following operations: performing a hash operation on the new MAC address which is used as the destination MAC address of the data flow and the load balancing algorithm, selecting a member link from the aggregation link used to forward the data flow according to the result of the hash operation, and forwarding the data flow to the distribution layer using the selected member link.

It can be seen from the above description that, according to an example of the present disclosure, an access device in the access layer selects a member link from an aggregation link based on the destination MAC address of a data stream sent from a terminal server, and forwards the data stream to the distribution layer through this selected member link. A stacking device in the distribution layer will select a member link from an aggregation link according to the principle of local forwarding first to forward the received data stream to the core layer, and monitors traffic in the aggregation link between the stacking device and the core layer. When a traffic unbalance is monitored in the aggregation link, the stacking device finds a data flow which causes said traffic unbalance from data flows transferred over the aggregation link, determines an incoming interface corresponding to the found data flow, reallocates a new MAC address to the incoming interface, and sends the new MAC address allocated to the incoming interface to a terminal server through an access device. In this way, when the terminal server subsequently sends a data flow to the incoming interface that has been allocated the new MAC address, it uses this new MAC address as the destination MAC address for sending the data stream to an access device. When the access device receives this data stream, it uses this new MAC address to select a member link from the aggregation link and forwards this data stream to the distribution layer through this selected member link. And when a member device of the stacking device in the distribution layer receives the data stream, it selects a member link from the aggregation link according to the principle of local forwarding first and forwards this data stream to the core layer through this selected member link. In terms of probability, the member link determined by the access device based on the new MAC address would be different from the member link that was previously determined based on the old MAC address (i.e. the MAC address used before the new MAC address is allocated). This ensures that the two different data streams forwarded by the access device (i.e. the data stream with the new MAC address as its destination MAC address and the data stream with the old MAC address as its destination MAC address) arrive at different member devices of the stacking device in the distribution layer. According to the principle of local forwarding first, this will alleviate the phenomenon that abnormal traffic unbalance exists among member links in the aggregation link between the stacking device in the distribution layer and the core layer, and make this phenomenon transit to a better aspect (i.e. the traffic load between member links of the aggregation link is balanced).

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

The invention claimed is:

1. A method for balancing traffic load, wherein the method comprises:
   monitoring, by a stacking device in a distribution layer, traffic in an aggregation link between the stacking device and a core layer;
   detecting, by the stacking device, a traffic unbalance in the aggregation link;
   finding, by said stacking device, a data flow among data flows transferred over the aggregation link, which causes the traffic unbalance;
   determining, by said stacking device, an incoming interface through which the found data flow enters said stacking device;
   reallocating, by the stacking device, a new MAC address to the incoming interface; and
   sending, by the stacking device, the new MAC address allocated to the incoming interface to a terminal server, wherein the sending the new MAC address enables said traffic unbalance to transit to traffic balance of the aggregation link by way of said terminal server sending a data flow with the new MAC address as the destination MAC address.

2. The method according to claim 1, wherein monitoring said traffic unbalance in the aggregation link includes: determining that there is traffic unbalance in the aggregation link when the occupied bandwidth of a member link from the aggregation link exceeds a first set threshold value and the difference between bandwidths occupied by this member link and another member link exceeds a second set threshold value.

3. The method according to claim 2, wherein finding a data flow which causes the traffic unbalance from data flows transferred over the aggregation link comprises:
  finding a data flow transferred over a member link from the aggregation link the occupied bandwidth of which exceeds the first set threshold value and the difference between the occupied bandwidth of which and that of another member link exceeds the second set threshold value; and
  selecting a set number N of data flows from the found data flows according to a principle of choosing data flows with a large traffic, and determining the selected data flows as the data flows that cause traffic unbalance.

4. The method according to claim 1, wherein said determining by the stacking device an incoming interface through which the found data flow enters the stacking device comprises:
  for each data flow found, determining by said stacking device the source IP address of the data flow, and finding the incoming interface of the data flow by unicast reverse path forwarding (URPF) based on the determined source IP address;
  wherein said incoming interface is a virtual local area network (VLAN) virtual interface.

5. The method according to claim 1, wherein said sending by the stacking device the new MAC address allocated to the incoming interface to the terminal server comprises:
  sending by said stacking device a free address resolution protocol (ARP) message to an access layer over the incoming interface to which the new MAC address is allocated; mid forwarding, by an access device in the access layer which receives said free ARP message, said free ARP message to a terminal server to which the access device accesses.

6. The method according to claim 1, wherein sending the new MAC address to the terminal server comprises:
  sending, by the terminal server, a data flow with the destination MAC address being the new MAC address to an access device to which the terminal server accesses;
  after receiving the data flow sent by the terminal server, performing by said access device a hash operation on the destination MAC address of the data flow and the load balancing algorithm, selecting a member link from the aggregation link used to forward the data flow according to the result of the hash operation, and forwarding the data flow to the distribution layer via the selected member link; and
  when receiving the data flow, selecting, by a member device of the stacking device in the distribution layer, a member link from the aggregation link used to forward the data flow according to a principle of local forwarding first, and forwarding the data flow to the core layer via the selected member link.

7. A traffic load balancing apparatus, wherein the apparatus is a stacking device in a distribution layer and comprises:
  a processor; and
  a memory on which is stored machine readable instructions that are to cause the processor to:
    monitor traffic in an aggregation link between said apparatus and a core layer;
    detect a traffic unbalance in the aggregation link;
    find a data flow among data flows transferred over the aggregation link that causes the traffic unbalance;
    determine an incoming interface through which the found data flow enters said apparatus;
    reallocate a new MAC address to the incoming interface determined; and
    send the new MAC address allocated to the incoming interface to a terminal server, wherein the sending the new MAC address enables said traffic unbalance to transit to traffic balance of the aggregation link by way of said terminal server sending a data flow with the new MAC address as the destination MAC address.

8. The apparatus according to claim 7, wherein the machine readable instructions are further to cause the processor to: determine that there is traffic unbalance in the aggregation link when the bandwidth occupied by a member link from the aggregation link exceeds a first set threshold value and the difference between bandwidths occupied by this member link and another member link exceeds a second set threshold value.

9. The apparatus according to claim 8, wherein the machine readable instructions are further to cause the processor to: find a data flow transferred over a member link from the aggregation link the occupied bandwidth of which exceeds the first set threshold value and the difference between the occupied bandwidth of which and that of another member link exceeds the second set threshold value, select a set number N of data flows from the found data flows according to a principle of choosing data flows with a large traffic, and determine the selected data flows as the data flows that cause traffic unbalance.

10. The apparatus according to claim 7,
  wherein the machine readable instructions are further to cause the processor to determine for each found data flow, the source IP address of the data flow, and find an incoming interface of the data flow by unicast reverse path forwarding (URPF) based on the determined source IP address;
  wherein said incoming interface is a virtual local area network (VLAN) virtual interface.

11. The apparatus according to claim 7, wherein the machine readable instructions are further to cause the processor to send a free address resolution protocol (ARP) message to an access layer over the incoming interface to which the new MAC address is allocated, so that an access device in the access layer which receives said free ARP message forwards said free ARP message to a terminal server to which the access device accesses.

12. The apparatus according to claim 7,
  wherein said apparatus further comprises a plurality of member devices which are cascaded to form said apparatus;
  when receiving a data flow forwarded by an access device in the access layer, each member device selects a member link from the aggregation link used to forward the data flow according to a principle of local forwarding first, and forwards the data flow to the core layer via the selected member link; and
  wherein the destination MAC address of the data flow is the new MAC address, and the access device forwards the data flow to said member device through the following operations: performing a hash operation on the new MAC address which is used as the destination MAC address of the data flow and the load balancing algorithm, selecting a member link from the aggregation link used to forward the data flow according to the result of the hash operation, and forwarding the data flow to the distribution layer using the selected member link.

13. A non-transitory computer readable storage medium on which is stored machine readable instructions that when executed by a processor cause the processor to:
    monitor traffic in an aggregation link between said apparatus and a core layer;
    detect a traffic unbalance in the aggregation link;
    find a data flow among data flows transferred over the aggregation link that causes tile traffic unbalance;
    determine an incoming interface through which the found data flow enters said apparatus;
    reallocate a new MAC address to the incoming interface determined; and
    send the new MAC address allocated to the incoming interface to a terminal server, wherein the sending the new MAC address enables said traffic unbalance to transit to traffic balance of the aggregation link by way of said terminal server sending a data flow with the new MAC address as the destination MAC address.

14. The non-transitory computer readable storage medium according to claim 13, wherein the machine readable instructions are further to cause the processor to: determine that there is traffic unbalance in the aggregation link when the bandwidth occupied by a member link from the aggregation link exceeds a first set threshold value and the difference between bandwidths occupied by this member link and another member link exceeds a second set threshold value.

15. The non-transitory computer readable storage medium according to claim 13, wherein the machine readable instructions are further to cause tile processor to: find a data flow transferred over a member link from the aggregation link the occupied bandwidth of which exceeds the first set threshold value and the difference between the occupied bandwidth of which and that of another member link exceeds the second set threshold value, select a set number N of data flows from the found data flows according to a principle of choosing data flows with a large traffic, and determine the selected data flows as the data flows that cause traffic unbalance.

* * * * *